United States Patent [19]
Cave

[11] 4,340,913
[45] Jul. 20, 1982

[54] TRI-LEVEL DIGITAL RECORDING

[75] Inventor: Ellis K. Cave, Garland, Tex.

[73] Assignee: TBS International, Inc., Richardson, Tex.

[21] Appl. No.: 225,278

[22] Filed: Jan. 15, 1981

Related U.S. Application Data

[62] Division of Ser. No. 108,818, Dec. 31, 1979.

[51] Int. Cl.³ .............................................. G11B 5/09
[52] U.S. Cl. ......................................... 360/40; 360/46
[58] Field of Search ............................. 360/39, 40, 46

[56] References Cited
U.S. PATENT DOCUMENTS 2,954,267 9/1960 Canepa .................................. 360/40
4,067,050 1/1978 Munninghoff ........................ 360/40
4,202,016 5/1980 Sampey ................................. 360/40

Primary Examiner—Vincent P. Canney
Attorney, Agent, or Firm—Granger Cook, Jr.; Edward D. Manzo

[57] ABSTRACT

A method and apparatus are disclosed for recording digital data on magnetic tape with an audio recorder. A logic circuit receives the data to be recorded and outputs two sequences of high and low levels: one sequence directly corresponds to the data and the other inversely corresponds to the data. One sequence is first inverted with respect to the other and the two sequences are then combined and recorded. After a data sequence, the two logic circuit outputs are placed at the same level, and the subsequent inversion of one output level relative to the other causes the combined levels to reach an intermediate, third level.

8 Claims, 15 Drawing Figures

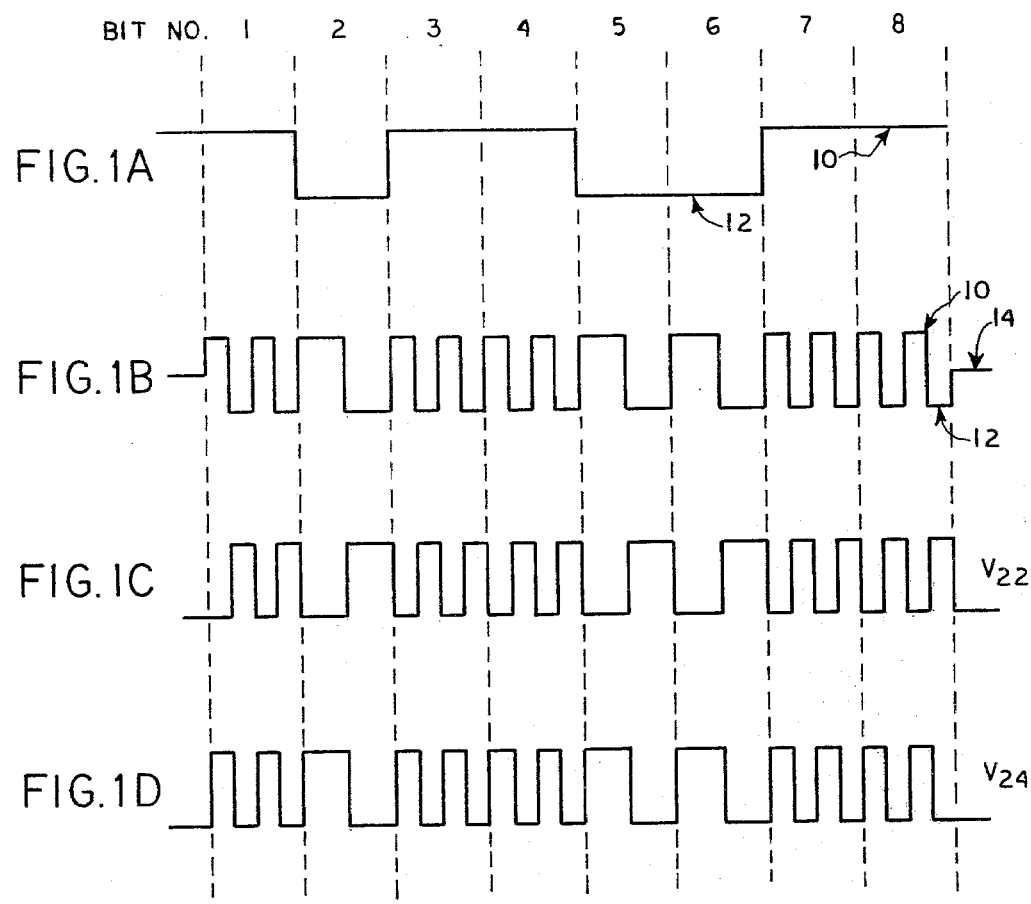
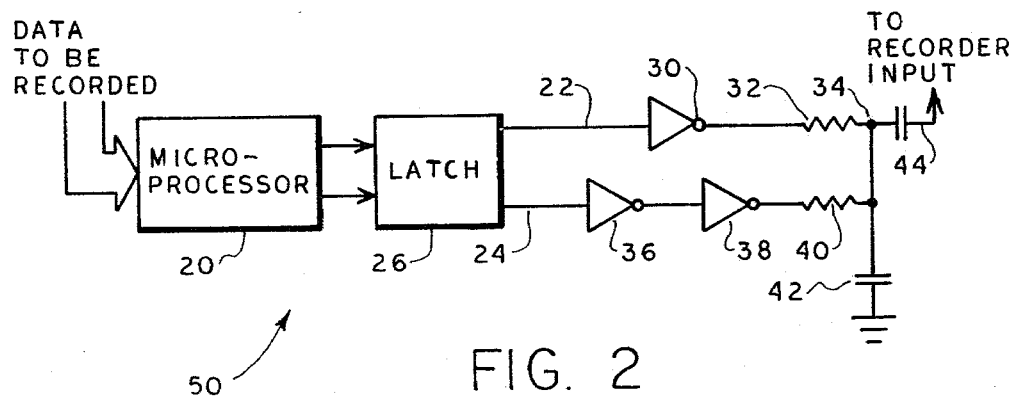

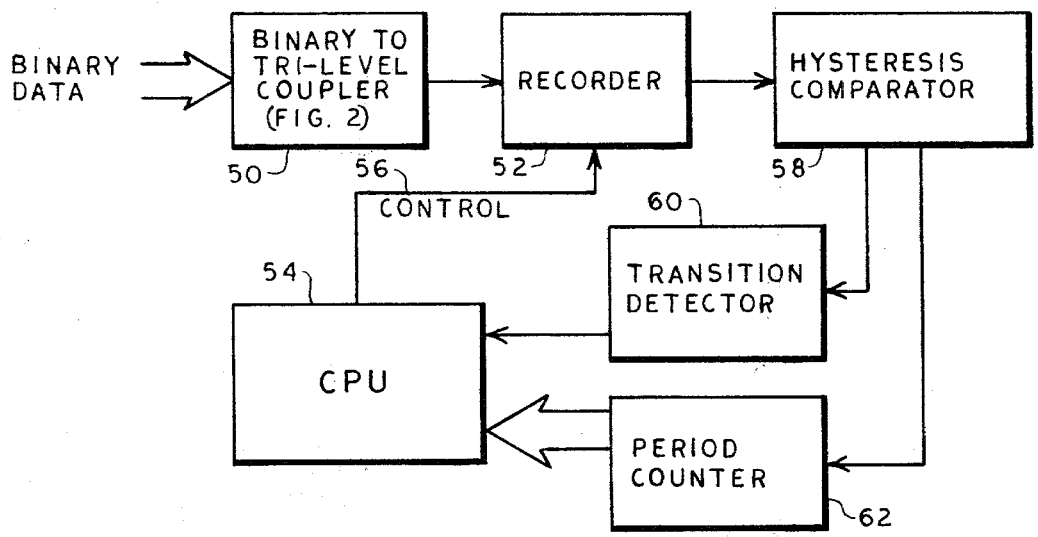
FIG. 4
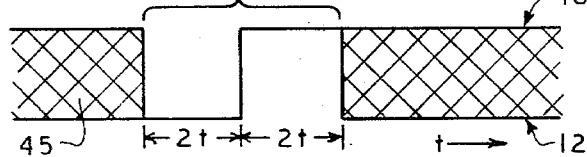
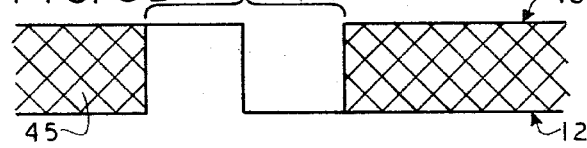
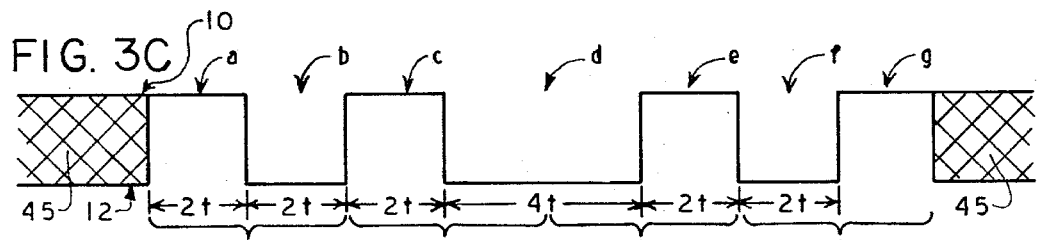
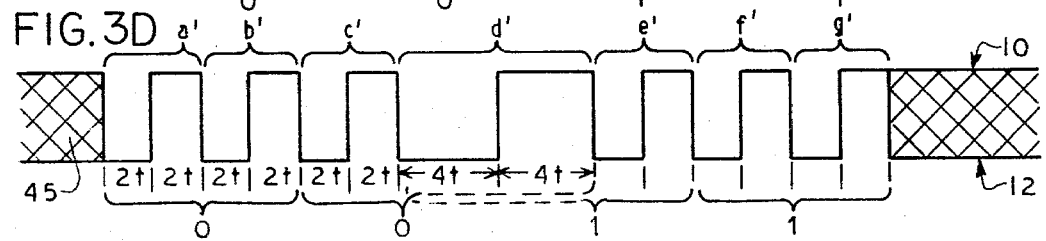

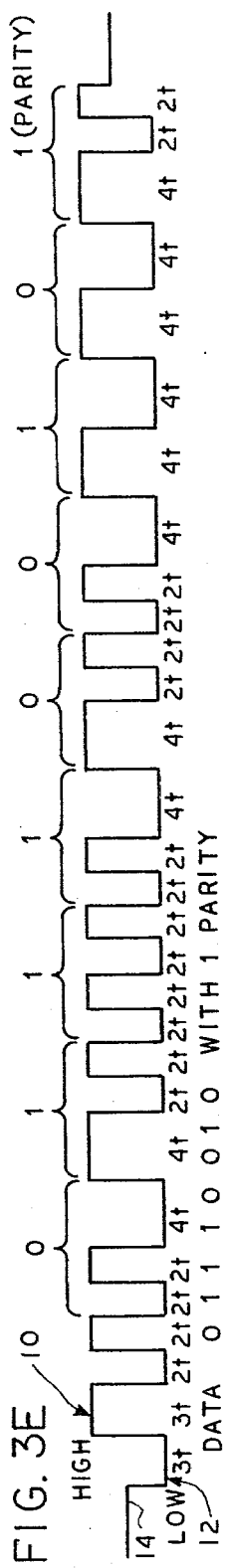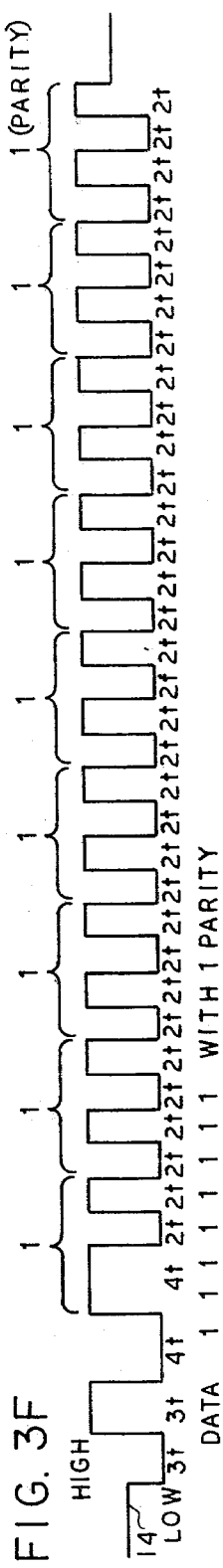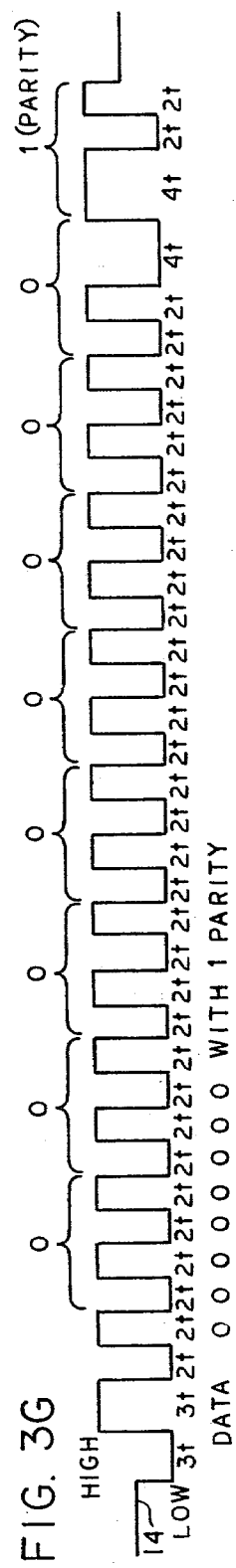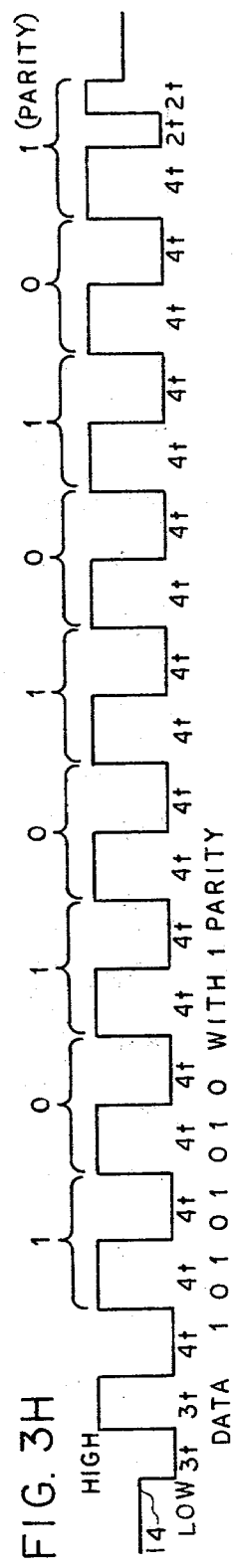

TRI-LEVEL DIGITAL RECORDING

This is a division of application Ser. No. 108,818, filed Dec. 31, 1979.

BACKGROUND OF THE INVENTION

The present invention relates to techniques for recording digital information on tape.

There are various applications in which it would be helpful to provide a digital track along side an analog track. For example, a system with a facility for carrying on a "conversation" with a person is particularly useful for telephonic banking. In such application, the cost of the system must be justified. Yet, it must also be very reliable—particularly in such operations as banking transactions.

In carrying on a conversation, the system must be able to give different vocalizations in response to various conditions. If the system asks a question to the banking customer and receives an answer, the system should determine whether the transaction is complete, and if not, ask the next intelligent question. However, if the response from the customer is inaudible or subject to some other infirmity, the system must remedy this problem by reasking the question or by advising the customer of the nature of the problem and then asking him to repeat his response. Hence, the system must have a facility for determining whether the "conversation" is proceeding properly, and must further be able to give vocalizations, whether in the form of responses or questions, depending on various conditions.

Such a system may use tape recorders to carry on and record the "conversation." The system is faced with the problem of keeping an accurate record of where various responses or questions or other vocalizations are prerecorded on a tape. For this, the system can use two tracks of recording, one track having the audio vocalizations prerecorded thereon, and the other track having digital data recorded thereon which corresponds to the audio information. The system can select a vocalization to articulate by playing back the tape recorder and by means of the digital data recorded on the tape, can move the tape to the proper starting point for the selected vocalization.

Although audio tape recorders are well adapted for recording signals such as voice that have a zero DC component, they are not well-suited to recording digital data. Digital data can easily include a substantial DC component, such as a string of high logic signals which will degrade to a zero or middle level if it is presented to the audio tape recorder for recording. This results in a loss of data.

The simplest, least expensive way to write digital data on an audio tape recorder requires a startup period. Basically, a bit coming off a processor, port can be coupled to the audio input of the recorder. The computer or processor can use a modulation scheme using square waves to signify the logic states. However, when the processor stops modulating the square wave signal, its voltage level is at one of the two extremes, high or low. This causes the electronics of the tape recorder to drift up to or down to that level. The, when new information is applied to the recorder for recording, the recorder electronics requires between one-half and one second to recover the reference or datum level. In other words, the reference level is lost at the termination of an ordinary square wave and unless it is restored by a subsequent procedure, the next data that are written will not be reliably recorded. In various applications where a given response is needed from the system, such as where the system "converses" with a person, the time required for a subsequent proceeding is not available.

It is therefore another object of the present invention to provide a method and apparatus for reliably recording digital data using an audio tape recorder.

It is further object to provide an inexpensive method and apparatus for recording digital data with an audio tape recorder.

SUMMARY OF THE INVENTION

According to one aspect of the invention, a system is provided for communicating with a person on a predetermined subject. The system includes a first audio tape recorder equipped with a tape having two tracks. On one track, a set of vocalizations relevant to the predetermined subject has been prerecorded. This may be done in a sound studio as is well known to the art. The tape has a second track on which are prerecorded a set of digital, machine-readable signals. Such signals correspond to the vocalization set, and the two tracks are played in time registration so that the system knows the locations on the tape of various vocalizations.

The system uses a second audio tape recorder for recording the vocalizations of the person communicating with the system. A processor controls the activation of both the first and the second tape recorder. It determines whether the information is being safely recorded and can be programmed to evaluate data presented by the person communicating with the system. For example, the person may communicate his bank account number to the system by pressing the numbers identifying his account on a Touch-Tone telephone or by dialing his account number on a dial type telephone.

In response to certain determinations by the processor, the processor will cause the first tape recorder to move its tape to a position at which an appropriate prerecorded vocalization begins, and then to replay the vocalization to the person. At an appropriate time the second audio tape recorder will record incoming information from the person communicating with the system or may record both incoming and outgoing information for a complete record of the communication.

According to another aspect of the invention, in communicating a data word to be recorded on the tape track, signals representing the data word are generated by a tri-level coupler and inputted to the recorder for recording. At the end of each data word, the signal outputted by the tri-level coupler returns to a datum or reference level which is intermediate the high and low logic state voltages (illustratively).

In the method practiced by the illustrated coupler, a logic circuit receives data to be recorded and emits on a first output a first signal directly corresponding to the data. A second signal corresponding inversely to the data is emitted on a second output of the logic circuit. The second signal is then inverted so that each of the two outputs corresponds directly to the data. These outputs are coupled by a voltage divider to a circuit point which is capacitively coupled to the input of the audio recorder.

After the data are thus communicated, the logic circuit causes its two outputs to have the same voltage (or logic state). Due to the inversion of one output and the voltage divider, the circuit point will have a voltage level which is intermediate the voltage levels corresponding to the high and low logic states.

The consequence of this is that the audio recorder electronics will have a reference level at the end of each data word. The first bit of the next data word will have a voltage level departure from the reference level and will be reliably recorded.

BRIEF DESCRIPTION OF THE DRAWINGS

In describing a preferred embodiment of the present invention, reference is made to the accompanying drawings wherein:

FIG. 1 is a set of representative wave diagrams illustrating digital data to be recorded (FIG. 1A), a tri-level representation of such data modulated according to one modulation scheme (FIG. 1B), and signals generated in the apparatus below described (FIG's. 1C and 1D); which is useful in understanding the present invention;

FIG. 2 is a circuit diagram illustrating a tri-level recording apparatus according to the present invention.

FIG. 3 consisting of FIGS. 3A through 3H is a set of representative wave diagrams illustrating a second modulation scheme for modulating data;

FIGS. 4 and 5 and diagrams illustrating apparatus for demodulating the modulation scheme of FIG. 3.

DESCRIPTION OF A PREFERRED EMBODIMENT

Figure 5:
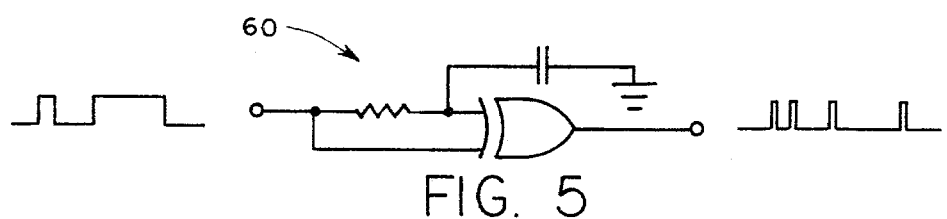

The aspect of the invention relating to recording digital data on tape will first be described. FIG. 1A schematically illustrates an arbitrary eight-bit binary word plotted against time and voltage. A logical high state is represented by a certain positive voltage level 10, and a logic low state is represented by a zero voltage level 12. The first and last bits of the illustrated eight-bit word of FIG. 1A are at a high level. If this word is impressed on line coupled to the input of an audio tape recorder, after the conclusion of the word, the recorder electronics will drift towards the positive voltage representing the high voltage level at the end of the last bit. When the next data word is communicated to the recorder, the first bit can easily be lost due to the lost reference level occasioned by this drift in the recorder electronics.

According to the method of the present invention, however, at the end of communicating a certain quantity of information, illustratively an eight-bit word, the voltage level is returned to some particular voltage level. FIG. 1B illustrates the data of FIG. 1A modulated according to one modulation technique described below, but having a voltage level 14 intermediate the high and low levels 10 and 12. Returning to level 14 will preserve the datum level of the audio recorder electronics, so that the next data word to be recorded can begin from reference level 14 and record information reliably. Thus, the first bit of FIG. 1B starts at level 14.

FIG. 2 shows illustrative apparatus for practicing the method of FIG. 1B. Digital data to be recorded is applied to a microprocessor 20 in eight-bit parallel format. Microprocessor 20 itself or with the assistance of a parallel to serial converter (not shown) converts the data to serial format and outputs corresponding signals on two output leads 22 and 24. As a complex circuit environment may require more port capability than the microprocessor has, a latch 26 can be used to couple the output ports of microprocessor 20 and thereby expand the port capability.

Output 22 is applied to the input of an inverter 30. The output of inverter 30 is coupled by a resister 32 to a circuit point 34.

The output 24 from microprocessor 20 is coupled to inverters 36 and 38 connected in series. These two inverters in series convert the zero to three volt swing of TTL logic of the microprocessor to CMOS voltage levels so that the voltage swing between the high and low logic states is about five volts. The output of inverter 38 is coupled by a resister 40, matched to resistor 32, to circuit point 34. A roll-off capacitor 42 couples point 34 to ground, and a capacitor 44 couples circuit point 34 to the input of an audio tape recorder, illustratively the "line" input.

The microprocessor can use a variety of modulation techniques, such as the so-called "Kansas City standard." According to that modulation scheme as heretofore known, a modulator (i.e. microprocessor 20) outputs two cycles of a two kilohertz signal to indicate one binary logic state, and outputs one cycle of a one kilohertz signal to indicate the other binary signal. That scheme is modified to begin with and return to an intermediate voltage level 14, as shown in FIG. 1B. It will be understood that other signals may be inserted between the two instances of the voltage level 14, such as training signals in a preamble, or a parity bit, or others as are conventional in the art.

When the microprocessor 20 is not communicating a data word, it causes its output signals to be in parity, that is, both at the same state. It can be seen that when the signals on leads 22 and 24 are the same, opposite polarity but equal amplitude voltage levels will be outputted by inverters 30 and 38. These voltage levels are coupled by the voltage divider formed by matched resisters 32 and 40 to circuit point 34 which therefore will be at a voltage level precisely at the mean of the high and low voltage states.

To communicate a logic high state, the outputs of inverters 30 and 38 are both caused to be high, illustratively. In this case, the voltage level of lead 22 must be low, whereas the voltage level of lead 24 must be high. FIGS. 1C and 1D show the voltage levels on leads 22 and 24 corresponding to the data word of FIG. 1A. Thus, the conditions for generating a high logic level for the first bit are that $V_{22}$ is low and $V_{24}$ is high, as illustrated. Conversely, to output a logical low state for the second bit of FIG. 1A, the voltage on lead 22 must be high and the voltage on lead 24 must be low. These voltage levels are determined by microprocessor 20. It will be seen that the voltage $V_{24}$, but for the voltage levels at the beginning and end of the eight-bit word, corresponds to the data word of FIG. 1A. It will also be noted that the voltage $V_{22}$ shown in FIG. 1C corresponds inversely to the FIG. 1A data word.

At the end of the last bit, the voltage on each of leads 22 and 24 drops to or remains, illustratively, low. The low level of lead 22 will be inverted by inverter 30 to present a high voltage of one magnitude at circuit point 34. The low voltage on lead 24 will be inverted and then reinverted and presented to circuit point 34 as a voltage level of equal amplitude to that voltage derived through inverter 30 but of opposite polarity. Consequently, when the voltages $V_{22}$ and $V_{24}$ drop to low, the reference level of 2.5 volts, illustratively, will result at circuit point 34 and be communicated to the tape recorder by capacitor 44.

Another modulation scheme which can be used is a new modification of the well-known Manchester bi-phase technique. This new modification is a doubled, fully redundant, balanced, bipolar, Manchester bi-phase technique. This modification is a short-term balanced, highly noise resistant code. As illustrated below, it uses the tri-level recording, although it need not.

Referring to FIGS. 3A and 3B respectively, in a standard Manchester code, a level change from a low state 12 to high state 10 represents a logical "high" or "1" bit, and a change from high state 10 to low 12 is a "low" or "0" bit. (Shaded areas 45 represent indeterminate, irrelevant states). The data signals may be concatenated in various combinations. FIG. 3C shows the standard Manchester concatenation of bits "0011." It can be seen that such a concatenation is not short term balanced. This causes problems in recording on an audio recorder.

The modified code gives the data both a low duty cycle and a high duty cycle. FIG. 3D illustrates a "0011" word according to the modification, which doubles each standard Manchester representation and then concatenates the sequence. In FIG. 3C, the set of separate voltage levels of various durations is represented by the set a, b, c, d, e, f and g. In the modified code shown in FIG. 3D, this set is shown primed as a', b', c', d', e', f' and g'.

The remaining sketches in FIG. 3 illustrate other concatenations in the modified code and include other features. Thus, FIG. 3E shows the word "01110010" preceded by a preamble period for defining a period 3T against which a demodulator will compare subsequent periods of 2T or 4T. FIG. 3E also shows a parity bit following the eight bits of data. This parity bit is used in determining the reliability of data transmission in manners well-known to those skilled in the art. FIG. 3F illustrates the word "11111111"; FIG. 3G illustrates the word "00000000"; and FIG. 3H illustrates the word "10101010", each having respective preamble and parity bits.

FIG. 4 represents an illustrative system showing binary data inputted to the binary to tri-level coupler 50 of FIG. 2. The tri-level signal is recorded on tape by audio recorder 52. To retrieve the data from tape, a microprocessor central processing unit (CPU) 54 can command recorder 52 via a command control connection 56 to replay. The outputted signals thereof are then coupled to a device such as a hysteresis comparator 58 which gives symbol recognition with good noise immunity. Comparator 58 will not be triggered by the intermediate level 14 and will pass binary signals to a transition detector 60 and to a period counter 62, (FIG. 5 shows an illustrative transition detector 60.) The output of detector 60 interrupts CPU 54 from whatever it might be going and signals that the voltage level of the data signal has changed. The period counter measures the time between changes and communicates this data to CPU 54 on an eight line bus. It will be appreciated that CPU 54 could handle the functions of detector 60 and 62, but to free it for other activity, it is preferred to use the detector 60 and counter 62 combination. CPU 54 can discard alternate cycles and use standard Manchester decoding techiques to decode the data.

It is to be understood that any individual aspect of the present invention will be applicable to specific applications other than telephone banking. For example, the tri-level data recording method and/or apparatus is well suited to use with any computer system, especially low-cost systems used by home consumers or hobbyists.

It will be apparent to those who are skilled in the art that several modifications or alterations may be made to the embodiment of the tri-level recording apparatus described herein and other apparatus may be devised to practice the invented method. Is is therefor to be preferred that this specification be taken in an illustrative sense and that the scope of protection afforded be determined by the appended claims.

I claim:

1. A machine-implemented method for coupling binary digital information to be recorded to an analog recorder comprising:
   generating a first sequence of voltage levels corresponding directly to the data to be recorded;
   generating a second sequence of voltage levels corresponding inversely to the data to be recorded;
   inverting a selected one of said first and second sequences;
   combining said inverted sequence and the sequence not selected for inversion in time registration to provide an output sequence of voltage levels; and
   coupling said output sequence to the input of said recorder; then
   forming and coupling a third voltage level to the input of said recorder.

2. The method of claim 1 wherein said forming and coupling a third voltage level comprises controlling the voltage level of each of said first and second sequences to be equal.

3. The method according to claim 1 or 2 wherein said combining step comprises inverting a selected one of said first and second sequences and combining said inverted sequence additively to the sequence not selected for inversion, in time registration.

4. The method according to claim 3 wherein said third voltage level is intermediate said voltage levels of said first sequence.

5. Apparatus for facilitating recording of digital information on an analog recorder comprising:
   a logic circuit receiving the data to be recorded and outputting on first and second outputs signals related to the data to be recorded;
   means coupled to said logic circuit first output for inverting said first output with respect to second output;
   means coupling the output of said inverting means to a circuit point of said apparatus;
   means coupling said second output of said logic circuit to said circuit point, whereby when both of the outputs of said logic circuits are at the same voltage level, said circuit point will be at a voltage point intermediate the voltage levels corresponding to high and low logic states;
   said logic circuit outputting signals on said first output of said logic circuit inversely related to signals on said second output.

6. The apparatus of claim 5 further comprising a latch coupling said logic circuit to said inverter.

7. The apparatus of claim 5 further comprising a pair of series connected inverters coupling said second output of said logic circuit to the second named coupling means.

8. The apparatus according to claim 5, 6 or 7 further comprising a roll-off capacitor coupling said circuit point to ground, and further including a coupling capacitor coupling said circuit point to the input of the analog recorder.

* * * * *